United States Patent [19]
Fujita et al.

[11] Patent Number: 4,740,148
[45] Date of Patent: Apr. 26, 1988

[54] APPARATUS FOR SUPERVISING INJECTION STROKE OF INJECTION MOLDING MACHINES

[75] Inventors: Shigeru Fujita; Hideo Banzai; Hirotoshi Watanabe, all of Numazu, Japan

[73] Assignee: Toshiba Kikai Kabushiki Kaisha, Tokyo, Japan

[21] Appl. No.: 814,175

[22] Filed: Dec. 24, 1985

Related U.S. Application Data

[62] Division of Ser. No. 600,289, Apr. 13, 1984, abandoned.

[30] Foreign Application Priority Data

Apr. 20, 1983 [JP] Japan .................................. 58-69546

[51] Int. Cl.⁴ ............................................. B29C 45/77
[52] U.S. Cl. ................................. 425/149; 264/40.7; 364/185; 364/473; 364/476; 425/170; 425/171
[58] Field of Search ..................... 264/40.1, 40.3, 40.5, 264/40.7; 425/149, 143, 150, 170, 171; 364/153, 154, 185, 473, 476

[56] References Cited

U.S. PATENT DOCUMENTS

| | | | |
|---|---|---|---|
| 4,066,725 | 1/1978 | Boettner | 264/40.1 |
| 4,146,601 | 3/1979 | Bishop | 425/149 |
| 4,325,896 | 4/1982 | Rodgers, Jr. | 264/40.1 |

FOREIGN PATENT DOCUMENTS 156663 12/1980 Japan .

*Primary Examiner*—Jay H. Woo
*Assistant Examiner*—Timothy W. Heitbrink
*Attorney, Agent, or Firm*—Stevens, Davis, Miller & Mosher

[57] ABSTRACT

An apparatus for supervising an injection stroke of an injection machine of the type wherein injection parameters are detected at a number of points in a filling stroke, and detected parameters are sequentially sampled at a plurality of points over the entire filling stroke, the filling stroke is divided into a plurality of regions, and the injection parameters measured in respective divided regions are judged as to whether the parameters can produce satisfactory products or not. Such parameters are used as reference values and sequentially sampled parameters are subtracted by the reference values. The differences are accumulated for respective regions and when accumulated differences exceed predetermined permissible values an alarm signal is issued.

2 Claims, 1 Drawing Sheet

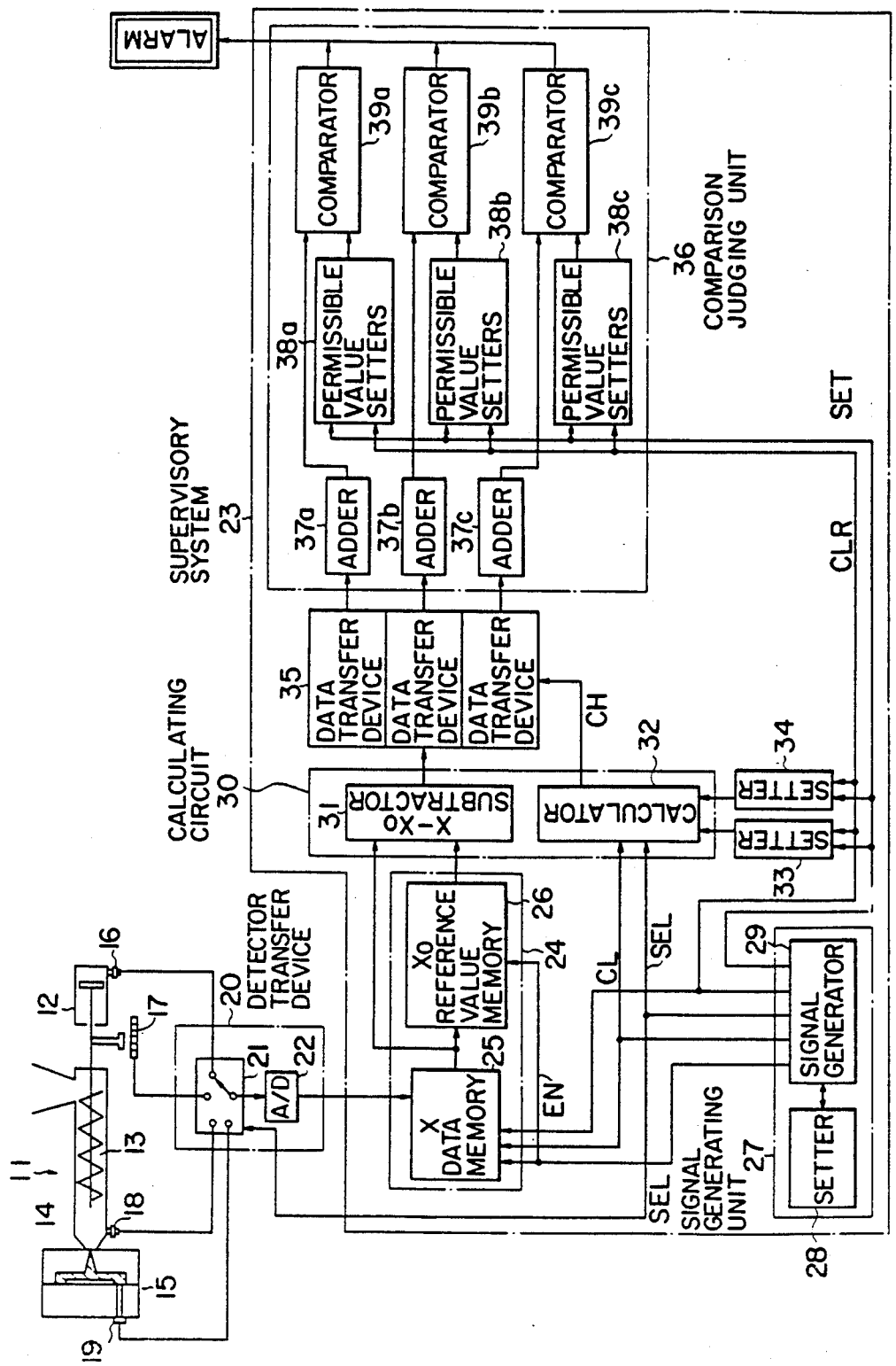

APPARATUS FOR SUPERVISING INJECTION STROKE OF INJECTION MOLDING MACHINES

This application is a divisional of application Ser. No. 600,289 filed Apr. 13, 1984, now abandoned.

BACKGROUND OF THE INVENTION

This invention relates to a method and apparatus for supervising the injection stroke of an injection molding machine, and more particularly to a method and apparatus for supervising the injection stroke wherein at least one detector is mounted on an injection molding machine, or a portion thereof, for example, a metal mold, and sampled pressures or speeds detected by the detector are compared with a reference value so as to judge whether the injection speed or pressure (hereinafter termed an injection parameter or factor) is optimum or not.

According to most of prior art supervisory apparatus, a detected value or pressure in which time is used as a variable is checked as to whether the detected value is within a permissible range or not at a preset time. To judge the performance of the filling state during a filling or injection stroke it has been necessary to judge whether the variation curve of the detected value coincides with the curve of a reference state or not, so that it is not sufficient to judge the injection parameter only at a set point.

As a solution of this problem the applicant has proposed a method of judging the deviation of the variation curve of the detected value from the reference curve by comparing detected values at a plurality of sampling points with a permissible value as disclosed in Japanese Laid Open Patent Specification No. 156663/1980. When carrying out this method into practice, it was noted that there are the following problems. Because, since the filling state varies variously it is impossible to select the sampling period to be commensurate with a specific state. For example, the performance at the build up portion of the filling stroke and that near the end of packing constitute important factors having a great influence upon the quality of the molded product. Since such factors change rapidly unless the sampling is made quickly, it is impossible to correctly know the filling states at the build up portion and the packing completion portion. However, at points intermediate of these portions, as the variation is slow, the sampling speed may be low.

When a sampling pattern is determined for the aforementioned pattern of the filling stroke, and where the injection speed or pressure varies greatly in the intermediate region, the sampling period would become large so that it becomes difficult to correctly grasp the rapid variation in the intermediate region.

In addition, where the capacity of a memory device is selected by taking into consideration such other factors as too short sampling period, difference in the sampling numbers caused by the difference in the filling time, and a molding requiring a long molding time, it is obliged to use a memory device having a very large capacity.

SUMMARY OF THE INVENTION

One of the objects of this invention is to provide an improved method and apparatus for supervising the filling stroke of an injection molding machine capable of judging whether the injection stroke is satisfactory or not in accordance with data sampled at many points along the stroke.

Another object of this invention is to provide a method and apparatus for supervising an injection stroke of an injection molding machine wherein an injection stroke is divided into a plurality of regions, for example a first region utilized to judge the characteristic at the build up portion of the injection stroke, a third region at or near completion of filling, a second region intermediate of the first and third regions and a fourth region following the second region, and in which the injection pressure is maintained so as to determine the state of variation in response to the filling starting operation, the packing state, apparent viscosity of the injected resin or plastic determined by the mold temperature, etc.

According to on aspect of this invention there is provided a method of supervising an injection process of an injection molding machine of the type wherein injection parameters are detected at a number of points in a filling stroke, and detected parameters are sequentially sampled at a plurality of points over an entire filling stroke, characterized by comprising the steps of dividing the filling stroke into a plurality of regions, and judging the injection parameters measured in respective divided regions as to whether the parameters can produce satisfactory products or not.

According to another aspect of this invention there is provided apparatus for supervising an injection machine, characterized by comprising at least one injection parameter detectors mounted on various portions of the injection machine; means for selecting either one of the parameters detected by the detectors; means for storing a reference value corresponding to parameters noted to yield satisfactory products; means for subtracting the reference value from a sampled value of detected parameters for each one of the regions obtained by dividing a filling stroke of the injection machine into a plurality of regions; means for accumulating differences obtained by the subtracting means for respective regions; means for setting permissible values for respective regions; and means for issuing an alarm signal when values obtained by the accumulating means exceed the permissible values.

BRIEF DESCRIPTION OF THE DRAWING

In the accompanying drawing a single figure is a block diagram showing one embodiment of the injection stroke supervisory apparatus according to this invention.

DESCRIPTION OF THE PREFERRED EMBODIMENT

A preferred embodiment of this invention shown in the accompanying drawing comprises an injection molding machine 11 including an injection cylinder 12, a screw plunger 13, a heating cylinder 14, a metal mold 15; and detectors 16, 17, 18 and 19 mounted on the injection cylinder 12 etc., as shown for detecting injection pressure, injection speed, resin pressure etc. More particularly, detector 16 detects the oil pressure in the injection cylinder 12, detector 17 takes the form of a magnetic scale and is utilized to measure the injection speed or a distance of movement of the injection piston, and detectors 18 and 19 detect the pressure of the molded resin in the heating cylinder 14 and the metal mold respectively.

A detector transfer device 20 including a transfer switch 21 and an A/D converter 22 is provided for selecting either one of the detectors 16 through 19 in accordance with a transfer signal to be described later so as to apply a selected value during the filling stroke to a supervisory system 23. This supervisory system comprises a memory circuit 24 including a data memory device 25 and a reference value memory device 26. When the operator of the molding machine 11 judges that the data stored in the data memory device 25 can be used as a reference value for yielding satisfactorily molded products, the operator depresses a button, not shown, of a setter 28 included in a signal generating unit 27. Then a signal generator 29 of the signal generating unit 27 generates a reference value setting signal EN which transfers a value which has been stored in the data memory device 25 to the reference value memory device 26 to act as a reference value Xo. There is also provided a calculating circuit 30 including a subtractor 31 and a calculator 32. After the reference value Xo has been transferred to the reference memory device 26, the subtractor 31 compares the reference value Xo with a value X stored in the data memory device 25 to calculate a difference X-Xo therebetween. When the push button of the setter 28 is depressed the signal generator 29 produces a detector selection signal SEL which is applied to calculator 32 together with a clock pulse CL and the outputs of setters 33 and 34 which have been set with the number of divided regions and the number of samplings of a stroke, respectively, for calculating the filling time. Then the calculator 32 determines the period and number of samplings in accordance with the filling time, which are supplied to a data transfer device 35 as a transfer signal CH. The purpose of the data transfer device 35 is to accumulate and distribute the differences X-Xo calculated by the subtractor 31 for respective regions in accordance with the transfer signal CH issued from the calculator 32, for example, build up and completion regions of the filling stroke, and the intermediate region.

A comparison/judging unit 36 is provided including adders 37a, 37b and 37c for accumulating the difference X-Xo from the data transfer device 35 for respective regions (in this example, 3), permissible value setters 38a-38c respectively set with permissible accumulated values predetermined for respective regions, and comparators 39a-39c respectively compare values set in the permissible value setters 38a 38c with the outputs of adders 37a-37c. When the result of comparison shows that the accumulated value exceeds the permissible value, comparators 39a-39c issue alarm signals. Each of the permissible value setters is supplied with a permissible value SET and a clear signal CLR which are generated by the signal generator 29.

The apparatus shown in the accompanying drawing operates as follows. When the push button of the setter 28 is depressed, a clock pulse CL is generated by the signal generator 29 to begin to count the injection stroke time. The sensor transfer signal SEL also generated by the signal generator 29 operates the transfer switch 21 to select either one of the detectors 16 through 19 to sample the stroke according to a predetermined mode. The sampled or detected value is inputted into the supervisory system 23. When the operator judges that the data stored in the data memory device 25 can be used as a reference value, the operator again depresses the button of the setter 28 to produce a reference value setting signal EN from the signal generator 29, the signal EN being inputted to the data memory device 25 so as to transfer the data in the data memory device 25 to the reference value memory device 26 to act as a reference value Xo. After setting the reference value Xo, the values detected by the detectors are all applied to subtractor 31 to calculate the differences X-Xo. At the same time the signal generator 29 produces a detector selection signal SEL applied to calculator 32 to produce a transfer signal CH which is applied to data transfer devices 35 also supplied with the difference signal X-Xo corresponding to a detector selected by the transfer switch 21.

The outputs of data transfer devices 35 are accumulated by adders 37a-37c respectively. The outputs of the adders 37a-37c are applied to comparators 39a-39c together with the outputs of the permissible value setters 38a-38c. When the accumulated values outputted by adders 37a-37c exceed the permissible values thus set, comparators 39a-39c issue alarm signals.

As above described according to this invention, as it is possible to determine the number and period of samplings in any region of the injection stroke there are the following advantages.

(1) It is possible to judge a number of factors by using a signal produced by a detector provided for each of a first region for judging the building up characteristic of filling, a third region at or near the end of filling, an intermediate second region, and a fourth pressure maintaining region following the second region thus supervising the injection stroke.

(2) In the first region it is possible to know the state of variation in the response to the filling starting operation.

(3) In the third region it is possible to judge a packing state determined by the reproducibility of the filling operation.

(4) In the second region it is possible to determine the apparent viscosity of the injected resin or plastic determined by the mold temperature and the lot thereof.

(5) In the fourth region it is possible to judge the stability of the operation of the packing and pressure maintaining strokes.

(6) It is possible to provide a practical supervisory system by combining judgement of data obtained by sampling at a number of points, division of the injection stroke into a number of regions and comparison of data measured at respective regions.

Instead of dividing the injection stroke into 3 or 4 regions, it can be divided into much more number of regions. Furthermore, it should be understood that instead of accumulating a difference X-Xo, the absolute value or the mean value of the difference can also be accumulated.

What is claimed is:

1. An apparatus for supervising an injection machine comprising:
a plurality of injection parameter detectors mounted on various protions of said injection machine for detecting respective machine speed or pressure parameters;
means for selecting one of the parameters detected by a said detector;
means for sampling said selected parameter at least once in each of a plurality of regions of an injection stroke of said injection machine;
means for storing a reference value for each of said regions corresponding to a value of said selected parameter for said region which yields a satisfactory product;

means for subtracting said reference value from a corresponding sampled parameter value for each one of said regions;
means for accumulating differences obtained by said substracting means for each of said regions;
means for setting permissible values for respective regions; and
means for issuing an alarm signal when values obtained by said accumulating means exceed a permissible value for a said region.

2. The apparatus according to claim 1 further comprising:

data transfer means connected between said subtracting means and said accumulating means;
calculating means, which in response to the number of said regions, and number of samplings, calculates a filling time so as to determine a period and number of samplings corresponding to said filling time, said calculating means producing a transfer signal representing said period and number of samplings thus determined; and,
means for applying said transfer signal to said data transfer means.

* * * * *